US008442859B1

(12) United States Patent
Broms et al.

(10) Patent No.: US 8,442,859 B1
(45) Date of Patent: May 14, 2013

(54) METHODS, SYSTEMS, AND COMPUTER PROGRAM PRODUCTS FOR OPTIMIZING LIQUIDITY AND PRICE DISCOVERY IN ADVERTISING MARKETS

(75) Inventors: Todd J. Broms, New York, NY (US); Amihai Ulman, Brooklyn, NY (US)

(73) Assignee: Managed Audience Share Solutions LLC, Brooklyn, NY (US)

( * ) Notice: Subject to any disclaimer, the term of this patent is extended or adjusted under 35 U.S.C. 154(b) by 0 days.

(21) Appl. No.: 13/450,041

(22) Filed: Apr. 18, 2012

Related U.S. Application Data

(60) Provisional application No. 61/579,796, filed on Dec. 23, 2011.

(51) Int. Cl.
*G06Q 30/00* (2012.01)
(52) U.S. Cl.
USPC .......................... 705/14.1; 705/14.4
(58) Field of Classification Search ............... 705/36 R, 705/37, 14.4
See application file for complete search history.

(56) References Cited

U.S. PATENT DOCUMENTS

| | | | |
|---|---|---|---|
| 4,903,201 A | 2/1990 | Wagner | |
| 5,128,752 A | 7/1992 | Von Kohorn | |
| 5,227,874 A | 7/1993 | Von Kohorn | |
| 5,249,044 A | 9/1993 | Von Kohorn | |
| 5,855,008 A | 12/1998 | Goldhaber et al. | |
| 5,950,176 A | 9/1999 | Keiser et al. | |
| 5,960,411 A | 9/1999 | Hartman et al. | |
| 6,405,180 B2* | 6/2002 | Tilfors et al. | 705/36 R |
| 6,421,653 B1* | 7/2002 | May | 705/36 R |
| 6,505,174 B1 | 1/2003 | Keiser et al. | |
| 6,567,850 B1 | 5/2003 | Freishtat et al. | |
| 6,766,524 B1 | 7/2004 | Matheny et al. | |
| 6,778,968 B1* | 8/2004 | Gulati | 705/36 R |
| 6,871,220 B1 | 3/2005 | Rajan et al. | |
| 7,006,991 B2 | 2/2006 | Keiser et al. | |
| 7,016,875 B1 | 3/2006 | Steele et al. | |
| 7,181,412 B1 | 2/2007 | Fulgoni et al. | |
| 7,260,837 B2 | 8/2007 | Abraham et al. | |
| 7,266,835 B2 | 9/2007 | Halbert | |
| 7,272,657 B2 | 9/2007 | Allen et al. | |
| 7,493,655 B2 | 2/2009 | Brown | |

(Continued)

FOREIGN PATENT DOCUMENTS

WO  WO 02/082295 A1   10/2002
WO  WO 2010/102104 A2   9/2010

OTHER PUBLICATIONS

"2010 Display Advertising Study," 20 pages, Collective: The Audience Engine, United States (2010).

(Continued)

*Primary Examiner* — John Weiss
*Assistant Examiner* — Bennett Sigmond
(74) *Attorney, Agent, or Firm* — Sterne, Kessler, Goldstein & Fox P.L.L.C.

(57) ABSTRACT

Systems, methods, and computer program products are provided for optimizing liquidity that an Audience Producer can access for the sale of audience profile access rights by having each individual audience profile access right listed using symbology that can garner the highest price discovery and depth of market. This is accomplished, in part, by providing multiple listing symbologies for a single asset, allowing for a determination of an optimized or improved symbology for obtaining a best purchase or sale price for a structured advertising asset.

30 Claims, 9 Drawing Sheets

U.S. PATENT DOCUMENTS

| | | | |
|---|---|---|---|
| 7,606,752 B2 | 10/2009 | Hazlehurst et al. | |
| 7,729,940 B2 | 6/2010 | Harvey et al. | |
| 7,747,515 B1 | 6/2010 | Merrin et al. | |
| 7,840,975 B2 | 11/2010 | Matheny et al. | |
| 7,856,378 B2 * | 12/2010 | Mashinsky et al. | 705/14.4 |
| 7,856,386 B2 | 12/2010 | Hazlehurst et al. | |
| 7,886,067 B2 | 2/2011 | Krassner et al. | |
| 7,962,363 B2 * | 6/2011 | Patel et al. | 705/14.4 |
| 8,027,864 B2 | 9/2011 | Gilbert | |
| 8,027,865 B2 | 9/2011 | Gilbert | |
| 8,032,405 B2 | 10/2011 | Gilbert | |
| 2002/0013757 A1 * | 1/2002 | Bykowsky et al. | 705/37 |
| 2003/0023483 A1 | 1/2003 | Messner et al. | |
| 2003/0171980 A1 | 9/2003 | Keiser et al. | |
| 2004/0049447 A1 | 3/2004 | Keiser et al. | |
| 2004/0220858 A1 | 11/2004 | Maggio | |
| 2005/0060232 A1 | 3/2005 | Maggio | |
| 2006/0129458 A1 | 6/2006 | Maggio | |
| 2006/0143110 A1 | 6/2006 | Keiser et al. | |
| 2006/0242016 A1 | 10/2006 | Chenard et al. | |
| 2006/0253330 A1 | 11/2006 | Maggio | |
| 2006/0271426 A1 * | 11/2006 | Borgs et al. | 705/14 |
| 2006/0282319 A1 | 12/2006 | Maggio | |
| 2007/0038516 A1 * | 2/2007 | Apple et al. | 705/14 |
| 2007/0083885 A1 * | 4/2007 | Harding | 725/34 |
| 2007/0130005 A1 | 6/2007 | Jaschke | |
| 2007/0185794 A1 | 8/2007 | Keiser et al. | |
| 2007/0198350 A1 | 8/2007 | O'Kelley et al. | |
| 2007/0214045 A1 * | 9/2007 | Subramanian et al. | 705/14 |
| 2007/0233857 A1 | 10/2007 | Cheng et al. | |
| 2007/0282733 A1 * | 12/2007 | May | 705/37 |
| 2007/0283268 A1 | 12/2007 | Berger et al. | |
| 2007/0288350 A1 * | 12/2007 | Bykowsky | 705/37 |
| 2007/0288953 A1 | 12/2007 | Sheeman et al. | |
| 2008/0082355 A1 | 4/2008 | Leach et al. | |
| 2008/0097825 A1 | 4/2008 | Leach et al. | |
| 2008/0109304 A1 | 5/2008 | Sarelson et al. | |
| 2008/0109321 A1 | 5/2008 | Leach et al. | |
| 2008/0154784 A1 | 6/2008 | Veeraraghavan | |
| 2008/0306846 A1 | 12/2008 | Ferguson | |
| 2009/0037325 A1 | 2/2009 | Sarelson et al. | |
| 2009/0055268 A1 | 2/2009 | Knoller et al. | |
| 2009/0076899 A1 * | 3/2009 | Gbodimowo | 705/14 |
| 2009/0106100 A1 | 4/2009 | Mashinsky | |
| 2009/0119172 A1 | 5/2009 | Soloff | |
| 2009/0234737 A1 | 9/2009 | Sarelson et al. | |
| 2009/0248565 A1 | 10/2009 | Chuang | |
| 2009/0259551 A1 | 10/2009 | Chenard et al. | |
| 2009/0259552 A1 | 10/2009 | Chenard et al. | |
| 2009/0327153 A1 | 12/2009 | Milne | |
| 2010/0030683 A1 | 2/2010 | Keiser et al. | |
| 2010/0058376 A1 | 3/2010 | Alhadeff et al. | |
| 2010/0100440 A1 | 4/2010 | Nickelson, III et al. | |
| 2010/0228642 A1 | 9/2010 | Baker et al. | |
| 2010/0287103 A1 | 11/2010 | Mason | |
| 2010/0293046 A1 | 11/2010 | Cooke et al. | |
| 2010/0293047 A1 | 11/2010 | Schwarz et al. | |
| 2010/0293063 A1 | 11/2010 | Atherton et al. | |
| 2011/0035266 A1 | 2/2011 | Patterson | |
| 2011/0035278 A1 | 2/2011 | Fordyce, III et al. | |
| 2011/0035280 A1 | 2/2011 | Fordyce, III et al. | |
| 2011/0035288 A1 | 2/2011 | Clyne | |
| 2011/0040632 A1 | 2/2011 | Margasahayam et al. | |
| 2011/0067045 A1 | 3/2011 | Matheny et al. | |
| 2011/0087519 A1 | 4/2011 | Fordyce, III et al. | |
| 2011/0087546 A1 | 4/2011 | Fordyce, III et al. | |
| 2011/0087547 A1 | 4/2011 | Fordyce, III et al. | |
| 2011/0087550 A1 | 4/2011 | Fordyce, III et al. | |
| 2011/0093324 A1 | 4/2011 | Fordyce, III et al. | |
| 2011/0093327 A1 | 4/2011 | Fordyce, III et al. | |
| 2011/0093335 A1 | 4/2011 | Fordyce, III et al. | |
| 2011/0099074 A1 | 4/2011 | Oak | |
| 2011/0125565 A1 | 5/2011 | MacIlwaine et al. | |
| 2011/0231223 A1 | 9/2011 | Winters | |
| 2011/0231225 A1 | 9/2011 | Winters | |
| 2011/0231257 A1 | 9/2011 | Winters | |
| 2011/0231258 A1 | 9/2011 | Winters | |
| 2011/0231305 A1 | 9/2011 | Winters | |

OTHER PUBLICATIONS

"Audience Targeting Platforms: The Missing Piece in the Online Ecosystem," 16 pages, AudienceScience, Inc., United States (2010).

"Audience Targeting: State of the Industry Study What's Happening Now and What's Next," 15 pages, AudienceScience, Inc., United States (2010).

"BrightRoll Video Advertising Report," 9 pages, *BrightRoll, Inc.* (BrightRoll.com), United States (Q1: 2010).

"BSYM—Identifiers Advance Cause of Open, Automated Securities Trading—Bloomberg Open Symbology Introduces New Operational Efficiencies and Cost Reductions for the Trading Community," 9 pages, Bloomberg Finance LP (2010 ).

"Building Brands Online: An Interactive Advertising Action Plan," 30 pages, Bain & Company/ AuidenceScience/ The Interacticve Advertising Bureau (IAB), United States (Apr. 2010).

"Communications & Media—Networked Advertising Growing revenue in a highly fragmented business," 36 pages, KPMG LLC, United States (2010).

"Data Usage & Control Primer: best practices & definitions," 19 pages, The Interactive Advertising Bureau (IAB), United States (May 2010).

"Getting Real—Ad Exchanges, RTB, and the future of online advertising," 19 pages, *DeSilva + Phillips, LLC, United States* (Mar. 2010).

"IAB Internet Advertising Revenue Report—An Industry Survey Conducted by PwC and Sponsored by the Interactive Advertising Bureau (IAB)," 25 pages, *The Interactive Advertising Bureau (IAB)/ PricewaterhouseCoopers LLP., United States* (2010 First Half-Year Results).

"MasterCard's Talks with Madison Avenue," *The Wall Street Journal*, 2 pages, WSJ.com, Dow Jones & Company, Inc., United States (Oct. 2011).

"Pattern of communication and the demand for connectivity," 55 pages, Ericsson Internal, Ericsson, United States/Sweden (Sep. 2009).

"Tapestry Segmentation—Reference Guide," 96 pages, accessed at <www.esri.com/tapestry>, ESRI, United States (2009).

"The Case for a Dedicated Online Ad Management Platform—How Technology Can Help Interactive Marketers Better Integrate Search and Display Media," A Forrester Consulting Thought Leadership Paper Commissioned by Efficient Frontier, 15 pages, *Forrester Research, Inc., United States* (Dec. 2010).

"Typical online display media order process," 1 page, NextMark, Inc. (2011).

"Visa's Blueprint for Targeted Advertising," *The Wall Streeet Journal*, 3 pages, WSJ.com, Dow Jones & Company, Inc., United States (Oct. 24, 2011).

Bahadur, N., et al., "Not Just Effective but Efficient: A New Blueprint for Marketing in an era of fragmented media," 7 pages, Booz Allen Hamilton Inc., United States (2007).

Ben, "How Real Time bidding, DSPs, SSPs, and Ad Exchanges Work," 3 pages, accessed at <http://www.adopsinsider.com/ad-serving/how-dsps-ssps-and-ad-exchanges-work/>, AdOpsInsider.com, United States (Dec. 2010).

Berman, S.J., et al., "The end of advertising as we know it," 28 pages, IBM Global Business Services, IBM Institute for Business Value, IBM Corporation, United States (2007).

Cooperstein, D.M., "The Future of Media Measurement for Marketing Leadership Professionals—Preparing for a Convergence of Measurement Across Channels," 16 pages, Forrester Research, Inc., United States (Jan. 2010).

Frelinghuysen, J and Joshi, A., "In search of a premium alternative: an action plan for online brand advertising," 16 pages, Bain & Company, Inc., United States (2010).

Gluck, M. and Sales, M.R., "The Future of Television? Advertising, technology and the pursuit of audiences," 160 pages, Annenberg School for Communication, University of Southern California, Norman Lear Center, USC Annenberg, The Norman Lear Center, United States (Sep. 2008).

Hansen, C., "Mapping Digital Display Landscape: A Fundamental Guide to Data, Targeting & the Future of Display," 74 pages, accessed at <http://www.netmining.com/>, Netmining LLC, United States (2011).

Ito, M., et al., "Living and Learning with New Media: Summary of Findings from the Digital Youth Project," *The John D. and Catherine T. MacArthur Foundation Reports on Digital Media and Learning*, 58 pages, The MIT Press, United States (Nov. 2008).

Montes, E., "The First Rule of Advertising Exchanges—There are No Advertising Exchanges," *ClickZ*, accessed at <clickz.com/clickz/.../rule-advertising-exchanges-advertising-exchanges>, ClickZ Media, United States (Oct. 2011).

Ratliff, L., "IPTV Market Tracker—Telco TV on Track to Reach 105 Million Subscribers in Five Years,"0 2 pages, iSuppli Corporation, *United States* (2009).

Simpson, P., "Advertising in a changing media landscape: The role of consumers as players in the game of advertising," University of California at Berkley, Haas School of Business, 37 pages, Deloitte Development LLC, United States (Mar. 2010).

Steel, E., "Using Credit Cards to Target Web Ads," *The Wall Street Journal*, 3 pages, WSJ.com, Dow Jones & Company, Inc., United States (Oct. 2011).

Vanboskirk, S., "US interactive Marketing Forecasts, 2009 to 2014 for Interactive Marketing Professionals" 22 pages, Forrester Research, Inc., United States (Jul. 2009).

Velez, R., "Big Data—How New Technology is Helping Marketers Create Better Consumer Experiences," 3 pages, accessed at <http://mashable.com/2011/05/02/big-data-marketing/>, Mashable, Inc., United States (May 2011).

Wasserman, T., "Facebook Now pays Users 10 Cents to Watch Certain Ads," 8 pages, accessed at <http://mashable.com/2011/05/06/facebookfacebook-10-cents-ads/>, Mashable, Inc., United States (May 2011 ).

International Search Report and Written Opinion of the International Searching Authority for International Application No. PCT/US2011/040746, Korean Intellectual Property Office, Republic of Korea, mailed on Feb. 21, 2012.

\* cited by examiner

METHODS, SYSTEMS, AND COMPUTER PROGRAM PRODUCTS FOR OPTIMIZING LIQUIDITY AND PRICE DISCOVERY IN ADVERTISING MARKETS

CROSS-REFERENCE TO RELATED APPLICATIONS

This application claims the benefit of U.S. Provisional Patent Application No. 61/579,796, filed Dec. 23, 2011, entitled "Methods, Systems, and Computer Program Products for Optimizing Liquidity and Price Discovery in Advertising Markets," which is incorporated by reference in its entirety herein.

This application is related to U.S. patent application Ser. No. 13/281,020, filed Oct. 25, 2011, entitled "Methods, Systems, and Computer Program Products for Managing Organized Binary Advertising Asset Markets," which is a continuation of U.S. patent application Ser. No. 13/162,179, filed Jun. 16, 2011, entitled "Methods, Systems, and Computer Program Products for Managing Organized Binary Advertising Asset Markets," which claims the benefit of U.S. Provisional Patent Application No. 61/398,259, filed Jun. 23, 2010, entitled "Methods, Systems, and Computer Program Products for Managing Organized Profile-Based Markets," all of which are incorporated by reference in their entireties herein.

BACKGROUND OF THE INVENTION

1. Field of the Invention

This disclosure relates to the field of structured financial instruments and, more particularly, to improved methods, systems, and computer program products for optimized liquidity and price discovery of audience profile access rights in association with an organized binary advertising asset market for structured advertising assets.

2. Background Art

The increasing sophistication and complexity of media markets, and of the advertising trading techniques used by participants in these markets, has led to growing interest in a variety of types of advertising and content, placed in direct markets including the Internet and elsewhere, around individual user behavior and interest. Many believe micro-markets are in need of an efficient advertising placement mechanism that allows for economically viable placements targeted to small well defined groups of potential customers.

One of the primary differences of an electronic market exchange system for structured advertising assets, specifically audience profile access rights, is the myriad of ways in which the profile of a single individual or group of individuals may be described such that advertisers find that profile to be of value. Existing market structures currently support a single listing for each asset, as nearly all markets today are built on the assumption that nearly all market participants will value the underlying asset in such a way that little variation exists in the distribution of bids and offers. Further, deficiencies in existing ad market structures are clear when the complexity of multiple asset valuations within the market are exhibited in a consumption-based primary market, where buyers may consume the purchased assets and sellers are subject to asset expiration without value.

Accordingly, what is desired are techniques for improving price discovery and depth of market for structured advertising assets.

BRIEF SUMMARY OF THE INVENTION

Aspects of the present invention relate to improved systems, methods, and computer program products for optimizing the sale pricing of audience profile access rights. This includes the ability to provide a pricing request associated with a single asset that may be represented by multiple listing symbols, receiving one or more orders for each listing symbol, the available volume represented in the limit order book of each listing symbol, selecting an order from the one or more orders with consideration of available volume, associated prices, and applying the process to a portfolio of assets wherein an optimized asset pricing across the portfolio is presented to the seller in association with the request to optimize the pricing of a single or multiple asset order in a form which includes, but is not limited to, a list of symbols and associated transaction size and price.

Unique to a market for structured advertising products is the ability to list single assets for sale under multiple listing symbols, in accordance with an embodiment of the present invention. The ability to list a portfolio of single assets represented by a plurality of listing symbols enables sellers and buyers to maximize revenue generated by the sale of the assets or minimize the expense generated by the purchase of the assets, respectively. In the improved systems, methods, and computer program products, a seller of the structured advertising assets (which comprise, but are not limited to, audience profile access rights) requests the listing symbol or symbols which would represent the optimal price for the possible sale of an asset or portfolio of assets. In a variation, a buyer is provided with the optimal listing symbol or symbols for the purchase of an asset or portfolio of assets.

The exemplary embodiments consist of major and subsidiary components implemented through a variety of separate and related computer systems. These components may be used either individually or in variety of combinations to achieve the objective of providing a new and improved way to enable content providers to price their specified target audience, for purchase or sale, anytime, based on real-time demand or otherwise, and anywhere without limitation of device platform or an association with content that may limit the distribution of that content. Further, the disclosed embodiments provide for commercialization of price optimization mechanisms within organized electronic marketplaces where rights to access audience profiles and or display space can be traded, in a primary or secondary market.

It is to be understood that both the foregoing general description and the following detailed description are not limiting, but are intended to provide further explanation of the invention claimed. Further features and advantages of the present invention, as well as the structure and operation of various embodiments thereof, are described in detail below with reference to the accompanying drawings. The accompanying drawings which are incorporated in and constitute part of the specification are included to illustrate and provide a further understanding of the methods, systems, and computer program products of the invention. Together with the description, the drawings serve to explain the principles of the invention.

It is noted that the invention is not limited to the specific embodiments described herein. Such embodiments are presented herein for illustrative purposes only. Additional embodiments will be apparent to persons skilled in the relevant art(s) based on the teachings contained herein. The section headings used herein are for organizational purposes only, and are not to be construed as limiting the subject matter described.

BRIEF DESCRIPTION OF THE DRAWINGS/FIGURES

The accompanying drawings, which are incorporated herein and form a part of the specification, illustrate embodiments of the present invention and, together with the description, further serve to explain the principles of the invention and to enable a person skilled in the relevant art to make and use the invention.

Figure 8:
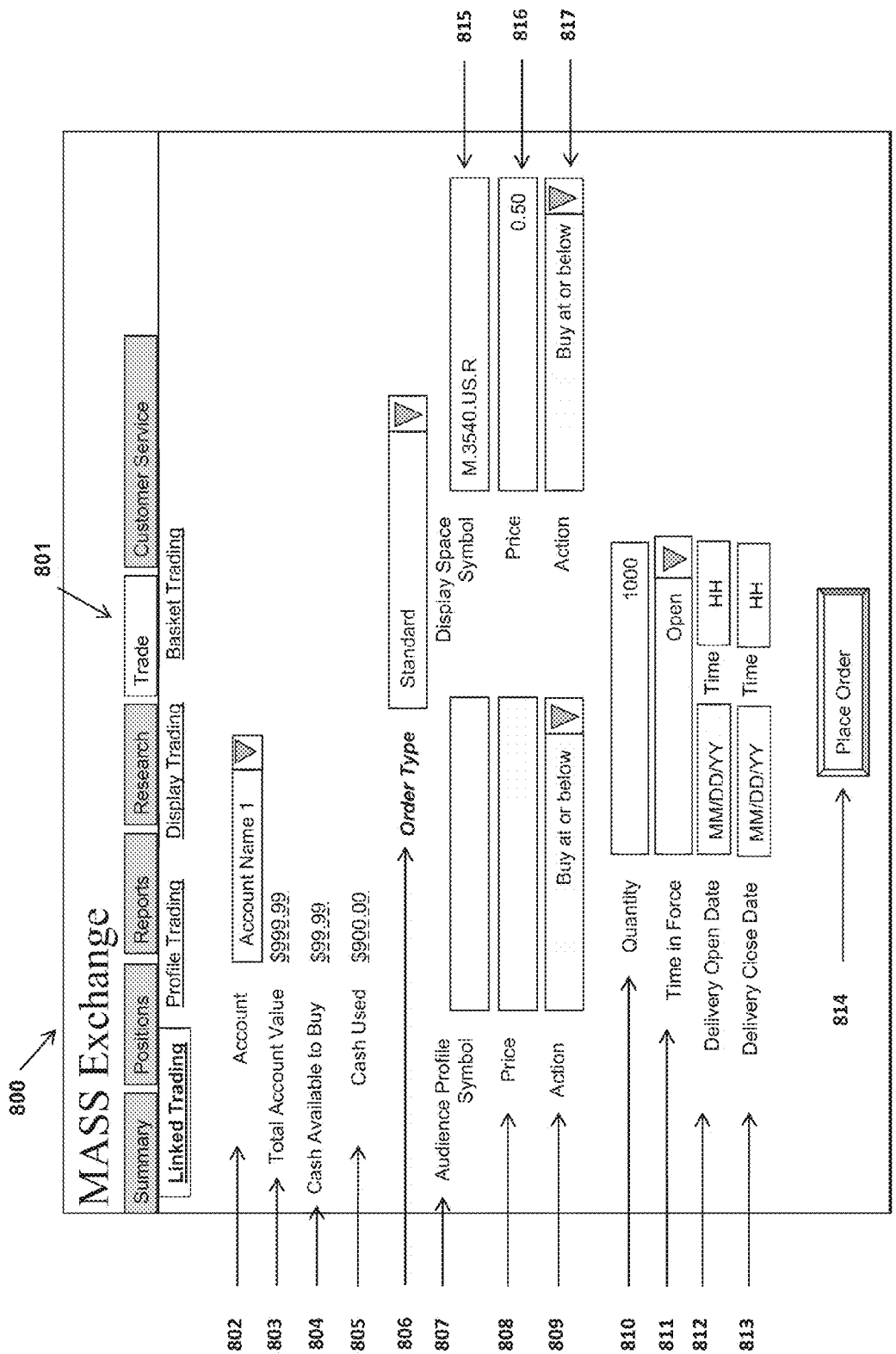

FIG. 8. illustrates an exemplary user interface for order entry of transaction in an organized electronic marketplace for structured advertising assets, in accordance with an embodiment of the present invention.

Figure 9:
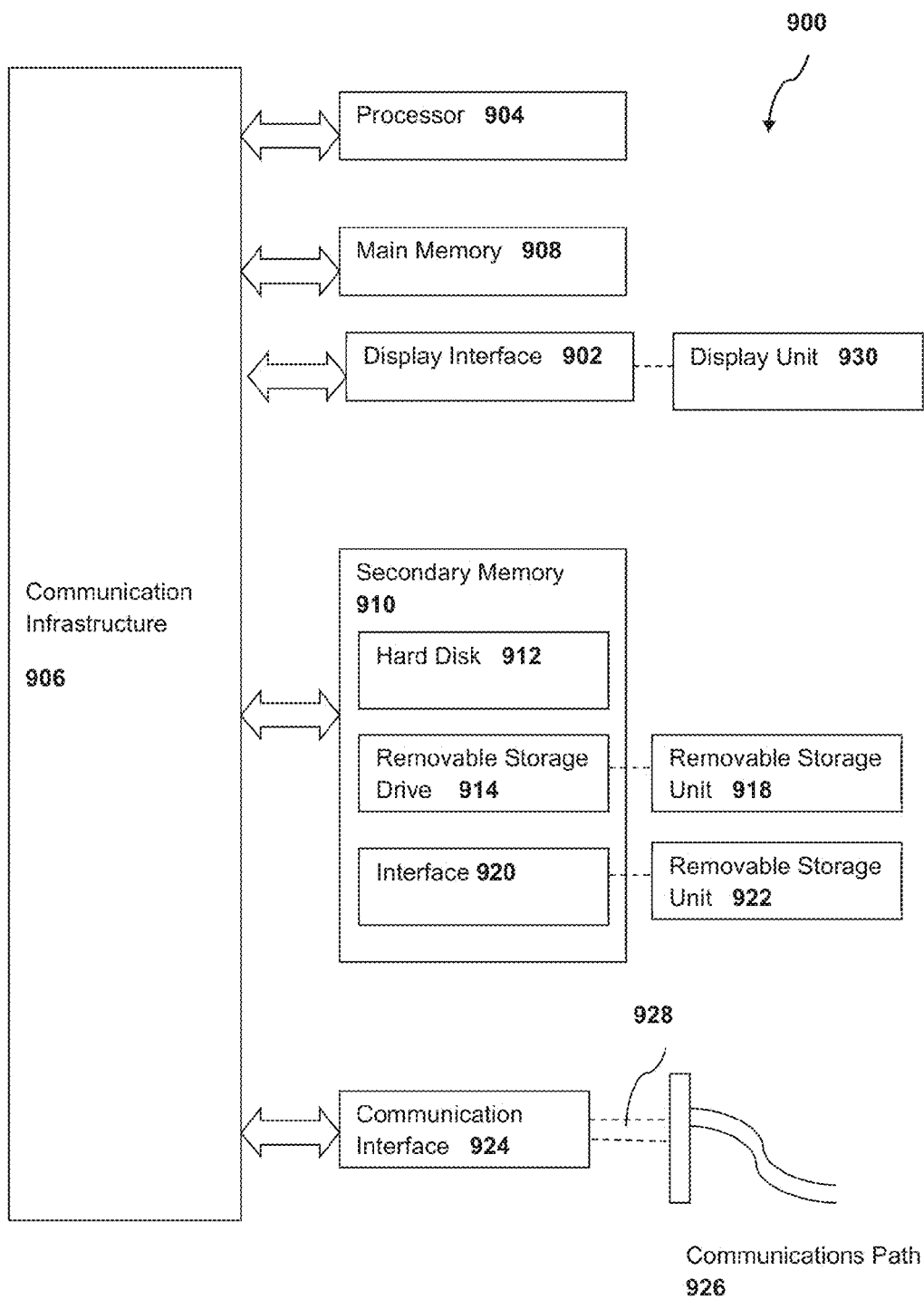

FIG. 9 depicts an example computer system in which embodiments of the present invention may be implemented.

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION OF THE INVENTION

I. Introduction

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

Embodiments of the present invention, as described below, may be implemented in many different embodiments of software, hardware, firmware, and the entities illustrated in the figures. Any actual software code with a specialized control of hardware to implement the present invention is not limiting to the present invention. The present disclosure is to be considered exemplifications of the invention and is not intended to limit this invention to the specific embodiments illustrated. Such embodiments are presented herein for illustrative purposes only. Additional embodiments will be apparent to persons skilled in the relevant art(s) based on the teachings contained herein. Thus, the operational behavior of the present invention will be described with the understanding that modifications and variations of the embodiments are possible, given the level of detail presented herein.

Reference to modules in this specification and the claims means any combination of hardware or software components for performing the indicated function. A module need not be a rigidly defined entity, such that several modules may overlap hardware and software components in functionality. For example, a software module may refer to a single line of code within a procedure, the procedure itself being a separate software module. One skilled in the relevant arts will understand that the functionality of modules may be defined in accordance with a number of stylistic or performance-optimizing techniques, for example.

Reference to structured advertising assets in this specification and claims means any individual or combination of audience profile access rights, display space access rights, derivative instruments, bundled instruments, and traditional advertising impressions, including but not limited to online impressions, television impressions, mobile device impressions, print impressions, and any other form of addressable and non-addressable media apparent to one skilled in the art. Additionally, one skilled in the relevant arts will appreciate that the techniques discussed herein with relation to structured advertising assets may be applicable to other types of assets, and such flexibility of the marketplace described herein is contemplated within the scope and spirit of this disclosure.

U.S. patent application Ser. No. 13/281,020, filed Oct. 25, 2011, entitled "Methods, Systems, and Computer Program Products for Managing Organized Binary Advertising Asset Markets," which is incorporated by reference herein in its entirety, provides a market in which an Audience Producer (an entity capable of delivering audience profile access rights and/or display space access rights, e.g., a web site owner, cable operator, newspaper publisher, etc.) can sell audience profile access rights and/or display space access rights as separate assets to an Audience Consumer (e.g., advertiser), by way of non-limiting example. This functionality on its own provides improved ways to connect Audience Producers with Audience Consumers to buy and sell these structured advertising assets with better information and better ability to price the assets at their expected value.

Much work continues to be done to improve on this innovation. One such improvement described herein is the ability to optimize the liquidity that an Audience Producer can access for the sale of audience profile access rights where each individual audience profile access right is listed using the listing symbology that can garner the highest price discovery and depth of market, in accordance with an embodiment of the present invention. As described below, a novel symbology selection process and a novel symbology assignment process is utilized to provide detailed and accurate symbols for the structured advertising assets.

The information provided by the aforementioned symbology processes is utilized, in accordance with an embodiment of the present invention, by providing an exchange environment with the ability to list a single asset for sale under multiple listing symbols to improve liquidity for transacting parties. In accordance with a further embodiment of the present invention, a process is provided for identifying multiple listing symbols for a single structured advertising asset, where the single structured advertising asset is offered for sale using multiple listing symbols simultaneously. In accordance with an additional embodiment of the present invention, the single structured advertising asset offered for sale using multiple listing symbols is assigned a single unique identifying symbol.

In accordance with another embodiment of the present invention, use of a single order or multiple orders with multiple symbols using an order-cancels-order process is provided to facilitate liquidity when multiple listing symbols are used where said assets are managed separately or in a synthetic process. This allows sell orders associated with multiple listing symbols to be cancelled when a separate order is fulfilled that exhausts the underlying asset (e.g., a single structured advertising asset being sold under multiple listing symbols with associated sell orders—when one sell order is matched, the other sell orders must be cancelled). In accordance with a further embodiment of the present invention, fulfillment of an order may modify outstanding sell orders (e.g., reducing inventory) to account for the sale of the underlying asset. Accordingly, while reference is made throughout to the order-cancels-order process, an order modification process can be utilized instead where appropriate, as will be understood by one skilled in the relevant art.

In determining what assets are available for sale by an Audience Producer, the market should provide Audience Consumers with some confidence about the Audience Producer's ability to perform. In accordance with an embodiment of the present invention, verification of assets is provided as part of a profile-based market. As described in further detail below, this can be accomplished through the use of third party data and analytics.

The exemplary, non-limiting embodiments disclosed herein meet the aforementioned needs by using novel price discovery mechanisms, novel order types, novel symbology selection processes, novel symbology assignment processes, novel order posting processes, novel designations and formats, and transaction processing features that permit the introduction of price discovery and unimpeded liquidity, in organized exchange environments—direct and alternative secondary markets, in accordance with embodiments of the present invention. Disclosed embodiments are designed to provide market participants with a new way to determine market price such that orders maximize access to liquidity and price discovery to a transactor (e.g., Audience Producers and Audience Consumers, or secondary market participants).

When specific commercial embodiments are described herein, such as by reference to existing Audience Producers and Audience Consumers, such descriptions are provided by way of example, and not limitation. One skilled in the relevant arts will appreciate that the examples provided herein can be implemented in other contexts, and that sufficient disclosure is provided to enable such implementation.

II. Verification of Assets and Inventory Creation

Before an Audience Producer is able to sell display space access rights and audience profile access rights (structured advertising assets), it is important to ascertain precisely what those rights are. Inventory in display space access rights is determined, in accordance with an embodiment of the present invention, by considering what advertising spaces are available on media published by the Audience Producer (e.g., a banner advertisement on a web page). However, ascertaining the audience profile access rights is more difficult, and it is not always acceptable to rely on a good faith estimate of the Audience Producer's available audience profile access rights (i.e., the particular make-up of the viewers of the display spaces of the corresponding display space access rights). Instead, third party data and analytics can provide a clearer picture of the scope of audience profile access rights, although one skilled in the relevant arts will appreciate that these techniques may be applicable to other structured advertising assets.

Figure 1:
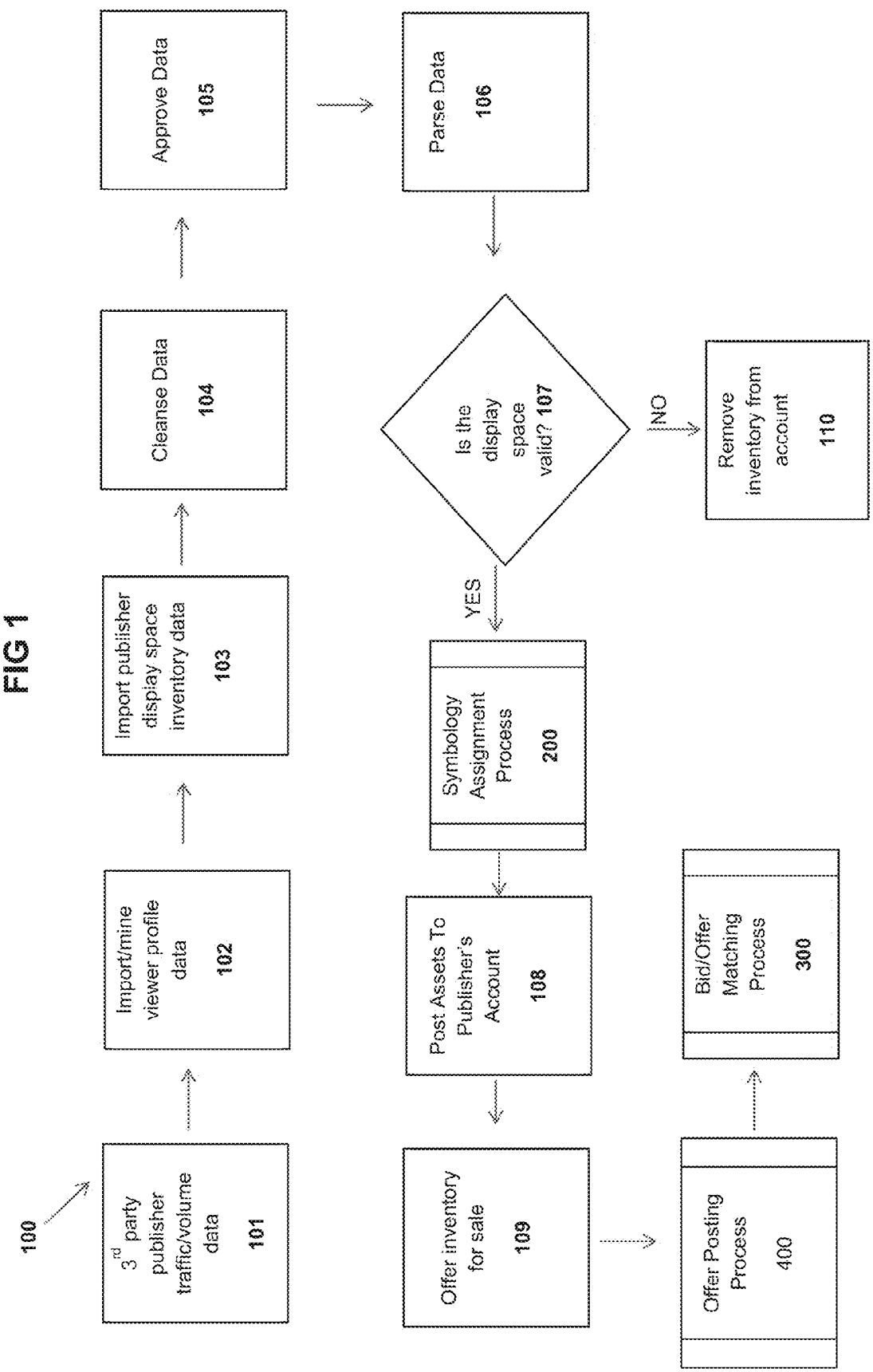
FIG. 1 illustrates a process 100 for the verification of structured advertising assets created for transaction in an organized electronic marketplace for structured advertising assets, in accordance with an embodiment of the present invention.

FIG. 1 illustrates a process 100 for the verification of structured advertising assets created for transaction in an organized electronic marketplace for structured advertising assets, in accordance with an embodiment of the present invention. The organized electronic marketplace will be referred to by several names throughout this disclosure, including by reference to components such as a brokerage system. One skilled in the relevant arts will appreciate that behavior attributed to any of these components can be allocated to different components of the overall system while achieving the same desired effect.

The process begins at step 101 where an Audience Producer wishing to sell display space access rights and audience profile access rights within the organized electronic market for structured advertising assets queries third party publisher traffic/volume data (e.g., analytic data) to establish its future capacity to create display space opportunities and audience profile access opportunities. By way of non-limiting example, this functionality is initiated using the interface depicted in FIG. 5, which is described in further detail below.

The Audience Producer provides viewer profile data at step 102 and display space inventory data at step 103 to the brokerage system, in accordance with an embodiment of the invention. If using an interface such as the interface of FIG. 5, where the interface is provided to the Audience Producer by an entity of the organized electronic market such as the brokerage system, the Audience Producer can import the viewer profile data at step 102 directly into the organized electronic market. This information includes, by way of non-limiting example, analytics data provided by Nielsen of New York, N.Y. when the Audience Producer is a television station or cable operator, or Webtrends of Portland, Oreg. when the Audience Producer is a web site operator.

With the necessary data for verification of the structured advertising assets available, the brokerage system then cleanses the data at step 104, in accordance with an embodiment of the present invention. In particular, the data from various supported external third-party analytics providers (e.g., Webtrends, Nielsen, Experian, Unica, Omniture, etc.) is reviewed to delete anomalies in the data likely to represent errors or non-conforming asset structures.

Once the verification data has been imported and cleansed, the data can be reviewed for approval at step 105, in accordance with an embodiment of the present invention. With the data approved, it is possible to create and allocate assets into the Audience Producer's account with the brokerage system. The profile data and the traffic/volume data are combined and the system then parses the data at step 106 in preparation to post the assets to the publisher's account (Audience Producer's account) at step 108, in accordance with an embodiment of the present invention. Parsing the data at step 106 allows the brokerage system to account for a variety of third-party analytics providers, each having their own unique formats for publishing analytics data.

In accordance with a further embodiment of the present invention, if the inventory to be offered by the Audience Producer represents online display advertising inventory, then the brokerage system checks for the validity of the display space inventory by querying the location of the display space at step 107. If the system finds that the descriptive display space data does not match the results of the query, the system will assign an expired or error status to the display space access right and remove the inventory from the Audience Producer's account at step 110. When the brokerage system finds that the descriptive display space data matches what is queried, or alternatively when the media is not callable (e.g., offline assets, although one skilled in the relevant arts will appreciate that these techniques can be converted for application to other non-web assets), the process proceeds to step 200.

The inventory is processed through the symbology assignment process at step 200, which is described in further detail below, in accordance with an embodiment of the present invention. Once symbols have been assigned to the asset, the Audience Producer instructs the brokerage system to offer its inventory for sale at step 109, in accordance with an embodiment of the present invention. In particular, once the Audience Producer's inventory has been verified, had symbols assigned, and posted to the Audience Producer's account, the Audience Producer can then sell or otherwise trade on their inventory. By way of non-limiting example, the Audience Producer can trade their inventory utilizing the user interface illustrated in FIG. 8, which is described in further detail below. The offer for sale is then processed through the offer posting process 400 and the bid/offer matching process 300, each of which is described in further detail below, in accordance with an embodiment of the present invention.

By way of non-limiting example, an Audience Producer that publishes television content can utilize the aforementioned process to sell audience profile access rights and display space access rights for an upcoming broadcast. Using the organized electronic market for structured advertising assets, the publisher (the Audience Producer) uses the brokerage system to import audience ratings data provided at step 101 or third party, publisher traffic/volume data, from one or more data providers such as The Nielsen Company, or another viewer measurement provider apparent to one skilled in the art, at step 102.

Continuing the above example, the brokerage system is configured to use the data imported at step 102 to estimate the number of display space access rights and audience profile access rights that will be available for advertising placement during a broadcast. The Audience Producer additionally imports publishers display space inventory data at step 103, which describes the attributes of the display space made available by the Audience Producer. The display space descriptive data and the audience profile data are then cleansed at step 104 where anomalies in the data likely to represent errors or non-conforming asset structures may be discovered and removed.

With the data cleansed the brokerage system approves the data for processing at step 105. The brokerage system then parses the data at step 106 to assign individual display space attributes to a display space access right asset and audience profile attributes to an audience profile access right asset, in accordance with an embodiment of the present invention.

For display space access rights in media that is callable such as online display, mobile display, or on-demand video, the system may, subject to certain parameters, automatically verify the presence and characteristic of the display space within the callable media at step 107. If the system finds that the descriptive display space data does not match what is queried from the callable media, the system will assign an expired or error status to the access right and remove the inventory from the Audience Producer's account at step 110. If everything is in order, the assets are provided with symbology through the symbology assignment process 200. The assets are then posted to the Audience Producer's (publisher) account at step 108. Once the assets are in the account the Audience Producer (e.g., television publisher) may offer inventory for sale at step 109 from the assets in the account, using a user interface provided by the brokerage system. With an offer to sell in place, the offer is processed through the offer posting process 400 and then the bid/offer matching process 300 to initiate the transaction, as described in further detail below, in accordance with an embodiment of the present invention.

III. Symbology Assignment

Figure 2:
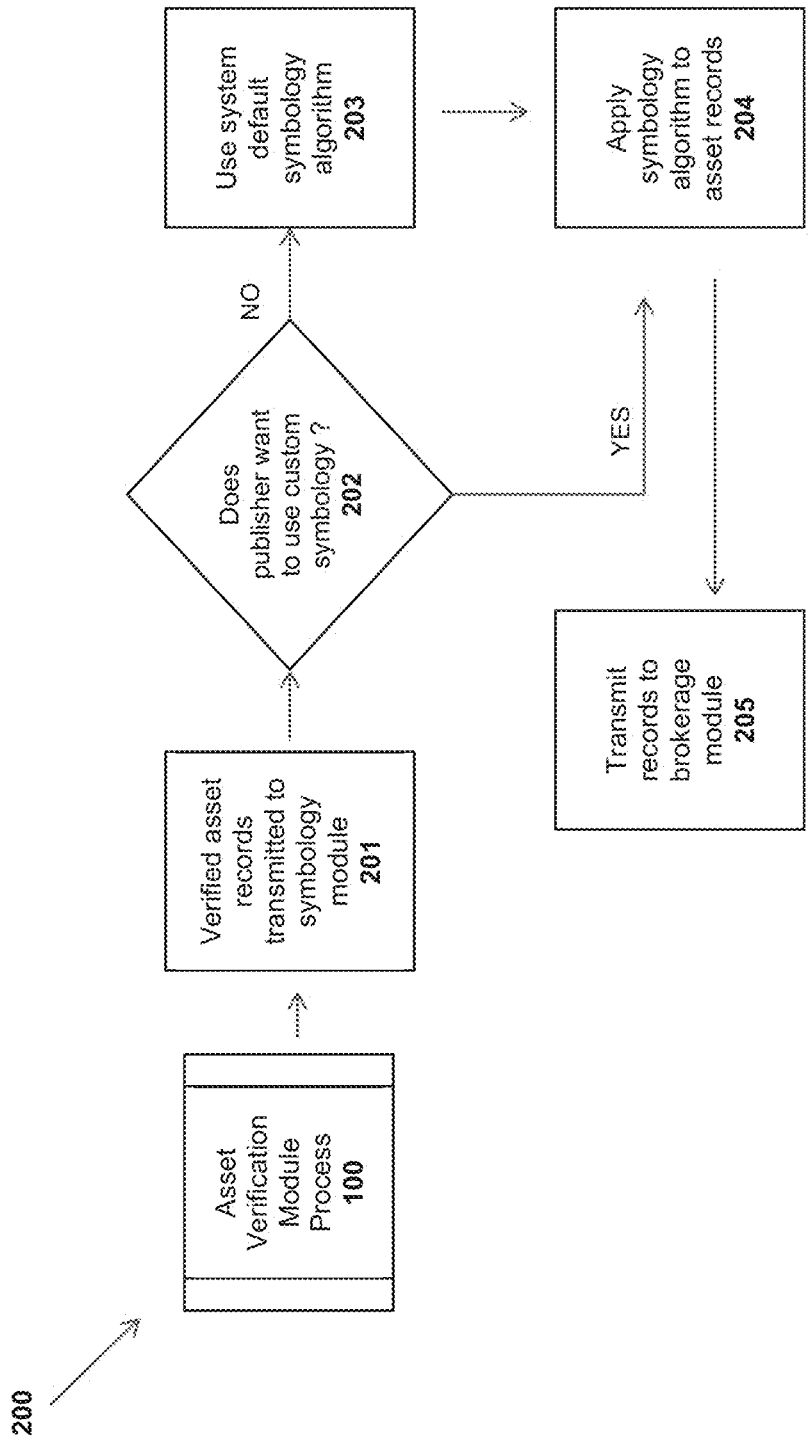
FIG. 2 illustrates a process 200 for the assignment of an identifying symbol to audience profile access rights and display space access rights, in accordance with an embodiment of the present invention.

FIG. 2 illustrates a process 200 for the assignment of an identifying symbol to audience profile access rights and display space access rights, in accordance with an embodiment of the present invention. In an embodiment, once the asset verification process described above at process 100 of FIG. 1 is completed, the descriptive data of each asset, audience profile access right and display space access right, is transmitted to a symbology module for symbology assignment at step 201. Since individual audience profile access rights may be described by multiple listing symbols, based on the underlying profile, an Audience Producer can post inventory for sale using a variety of symbology options. To optimize or otherwise improve the revenue that an Audience Producer can derive from the sale of audience profile access rights, each individual audience profile access right is listed using the symbology that will garner the highest price from Audience Consumers, in accordance with an embodiment of the present invention.

To achieve this improvement, the system determines if the publisher will use a custom symbology algorithm for the asset inventory at step 202. If the publisher has not selected a custom symbology algorithm the process uses a default symbology algorithm at step 203. In such an embodiment, the Audience Producer may allow the system to use a system-default algorithm, may set the system to use a user defined default algorithm, may have multiple pre-saved algorithms which are selected based on a set of rules, or may use a manual process for the definition of the appropriate symbology to use, by way of non-limiting example. If the brokerage system detects that the Audience Producer wants to use a custom symbology, the system allows the Audience Producer to select from one or more algorithms stored within the system at step 204, in accordance with an embodiment of the present invention.

The aforementioned custom symbology may be a part of an internal process implemented to realize the optimization of pricing as part of an external process for the optimization of pricing, or may be made available by any other method apparent to one skilled in the art. Once the symbology assignment process has been completed and the appropriate symbol or symbols have been applied to each audience profile access right or display space access right records the process transmits authorization and attributed symbology for posting to the publisher's account at step 205.

By way of example, an Audience Producer such as a cable television provider seeks to sell audience profile access rights and display space access rights for an upcoming broadcast using the profile-based market. In this example, the Audience Producer has completed the asset verification process 100 of FIG. 1 and has had the asset record posted to its account without corresponding symbology. Following the completion of the asset verification process 100, the data describing the audience profile access rights and display space access rights is transmitted to the symbology module for the application of a symbology algorithm and the assignment of symbols.

Continuing the aforementioned example, the revenue that the cable television provider is likely to receive from the sale of the audience profile access rights and display space access rights is optimized using the symbology assignment process 200. Using this process, the price that the cable television provider can receive in the profile-based market is based on the demand from advertisers, also known as Audience Consumers. Advertiser demand is best reflected by the existing bids to buy within the profile-based market's open limit order books and historical prices paid. In such an embodiment, the symbology algorithm chosen by the cable television provider, or a default selected based on certain conditions, is selected based on analysis of the asset records posted to the cable television provider's account.

IV. Bid/Offer Matching Process

Figure 3:
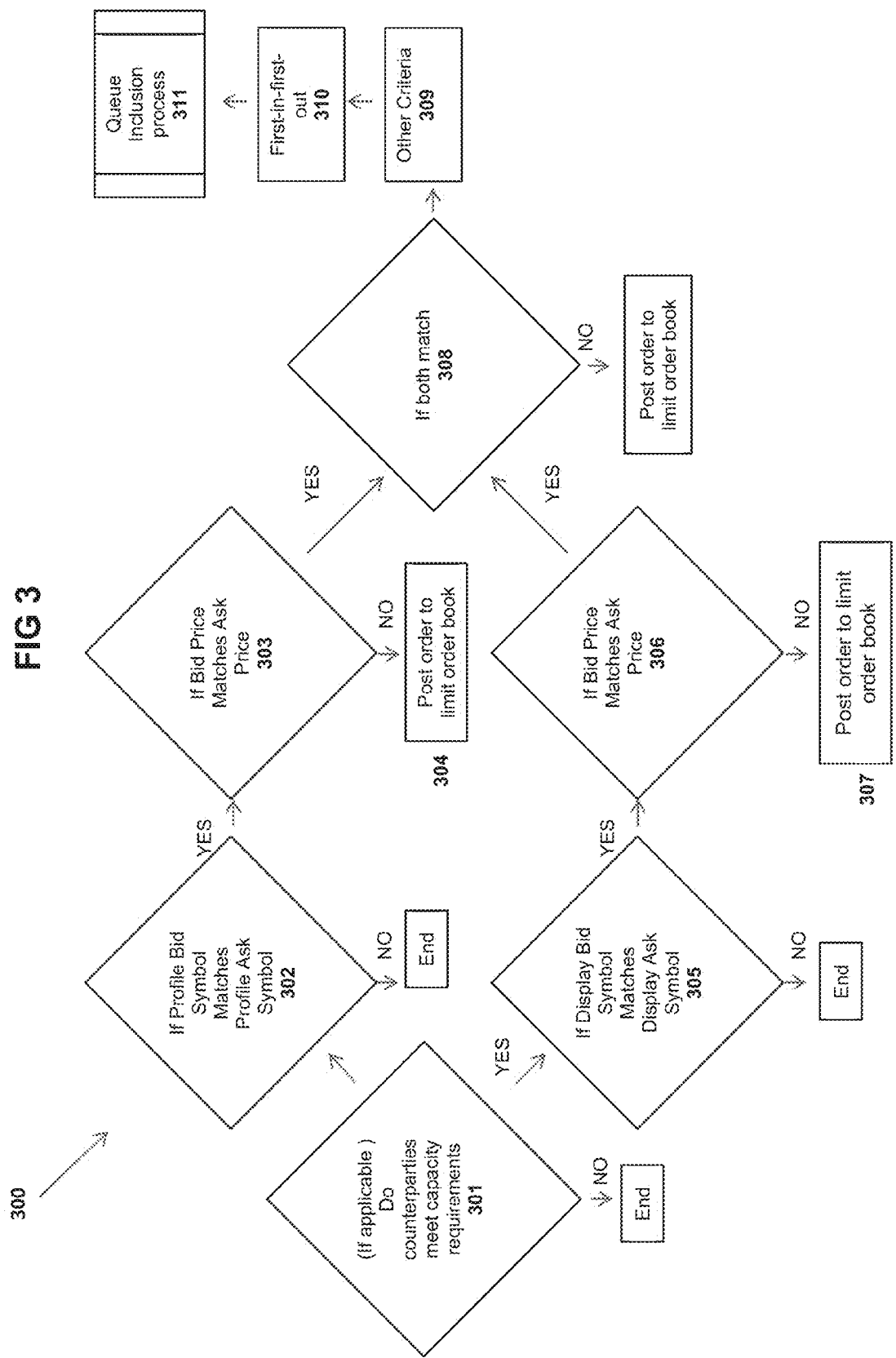
FIG. 3 illustrates a bid/offer matching process 300 for the matching of offers to sell with bids to buy audience profile access rights or display space access rights within a profile based-market, in accordance with an embodiment of the present invention.

FIG. 3 illustrates a bid/offer matching process 300 for the matching of offers to sell with bids to buy audience profile access rights or display space access rights within a profile based-market, in accordance with an embodiment of the present invention. In an embodiment, with offer submissions for the purchase or sale of audience profile access rights and display space access rights completed through the offer posting process 400 of FIG. 4 (described in further detail below), an audience matching system (which can be part of or separate from the organized electronic marketplace) processes the buy and sell orders to match possible buyers and sellers. In accordance with an embodiment of the present invention, the matching process is a parallel process that requires the matching of both audience profile access rights and display space access rights, unless executed in a synthetic-binary or simulated-binary environment.

In order for an advertiser to secure the right to place an advertisement or other content from an Audience Producer, a transaction with both the audience profile access right and the corresponding display space access right must be completed. The process begins by matching the symbols of the bid (buy) offer and the symbols of the ask (sell) offer. In certain cases, counterparties may be excluded from the match by a defined set of counterparties defined within the order or another method apparent to ore skilled in the art.

Based on the criteria of the order entered, the audience matching system determines whether the counterparties meet capacity requirements at step 301. In order for the matching process to continue, the capacity requirements, as defined by both buy and sell orders, must be met, in accordance with an embodiment of the present invention.

Next, the audience matching system will match the audience profile access rights contracts and the display space access rights contract in series or parallel. The audience matching system will then complete the following step of the matching process if the profile bid symbol matches the profile ask symbol, as determined at step 302, and if the display bid symbol matches the display ask symbol, as determined at step 305, in accordance with an embodiment of the present invention. Audience profile access right(s) will be referred to by several names throughout this disclosure, including by reference using the term profile(s). Further, display space access right(s) will be referred to by several names throughout this disclosure, including by reference using the term display(s).

The audience matching system then completes the next step of the matching process if the bid price matches the ask price, as determined at step 303, for the audience profile access right, and if the bid price matches the ask price, as determined at step 306, for the display space access right, in accordance with an embodiment of the present invention. If the system finds that either of the two orders do not match on price, the system will post the corresponding order to the respective limit order book at step 304 and/or 307 for both the profile access rights order and the display space access rights order. A completed transaction to secure the right to place an advertisement, or other content, is then initiated if both profile and display processes match, as determined at step 308, in accordance with an embodiment of the present invention.

Once the primary match requirements are fulfilled, other order requirements may be applied for order types such as all or none, or other order types apparent to one skilled in the art, at step 309. The next step of the matching process arranges the matched orders by their submission time, or other prioritization method apparent to one skilled in the art, and arranges the matched orders on the basis first-in-first-out at step 310, in accordance with an embodiment of the present invention. Once the transaction is completed, the aggregated audience profile access rights and display space access rights are incorporated in an Audience Producer's insertion order, or other publishing or fulfillment order apparent to one skilled in the art, at the queue inclusion process 311 step.

By way of non-limiting example, The New York Times is seeking to sell audience profile access rights and display space access rights relating to its NYT.com property for the placement of advertising or other content within its content. In this example, The New York Times uses its data describing the attributes of the display space it is offering, third party site traffic or ratings data, its own audience profile data, supplemental third party audience profile data, or any other sources of audience profile data, apparent to one skilled in the art, in the process of creating and defining assets within the profile-based market. Further in this example, the New York Time offers 1,000 audience profile access rights to assets with symbology indicating membership in group code 45, located in Los Angeles, 34 years of age, single, with a bachelor's degree, no children, and African-American. Additionally in this example, The New York Times enters orders to sell the aforementioned audience profile access rights along with 500 display space access rights for 728×90 IMU—(Leaderboard) and 500 display space access rights for 300×250 IMU—(Medium Rectangle) on a page within the business section of its online publication, NYT.com.

Continuing the above example, with the sell orders entered and submitted, the Audience Matching System queries existing bids to buy a total of 1000 of the audience profile access rights described by audience profile access rights listing symbols of TLe New York Times sell order, associated bids to buy 500 display space access rights for 500 728×90 IMU—(Leaderboard) described by display space access right listing symbols of The New York Times sell order, and associated bids to buy 500 display space access rights for 300×250 IMU—(Medium Rectangle) described by display space access right listing symbols of The New York Times sell order. In this example, the audience matching system will match orders to buy and sell on an individual access right basis. Therefore the audience matching system will attempt at least 2000 separate matches, where each audience profile access right match is contingent on an associated display space access right match. Matching may take place with or without contingency and for individual or multiple access rights contracts, without limitation, as is apparent to one skilled in the art.

Once the Audience Matching System finds the first buy and sell orders where the listing symbols for the profile access right and display space access right match (i.e., steps 302 and 305 of FIG. 3) and the bid price and the ask price of the buy and sell orders match (i.e., steps 303 and 306 of FIG. 3), the audience matching system transacts one of the two rights contracts and suspends the completion of the transaction until the second of the two rights contracts is transacted or completes the transactions in parallel.

With both transactions in place, the audience matching system transmits the asset purchase confirmation to the brokerage system and the insertion order associated with the transacted rights contracts are transmitted to the content delivery system for insertion, subject to the access rights contract terms, into the NYT.com ad server. The display space access rights may specify, by way of non-limiting example, a specific publishing time and a publishing term (e.g., mornings 7 am to 11 am from September 1st through September 31st). NYT.com would then fulfill the order, subject to the availability of an audience member with a profile matching the audience profile access right that was sold in conjunction with the display space access right, in a first-in-first-out order or any other method of prioritization apparent to one skilled in the art, as designated by the audience profile access rights contracts and the display space access rights contracts.

V. Market Operation with Illiquid Assets

Figure 4:
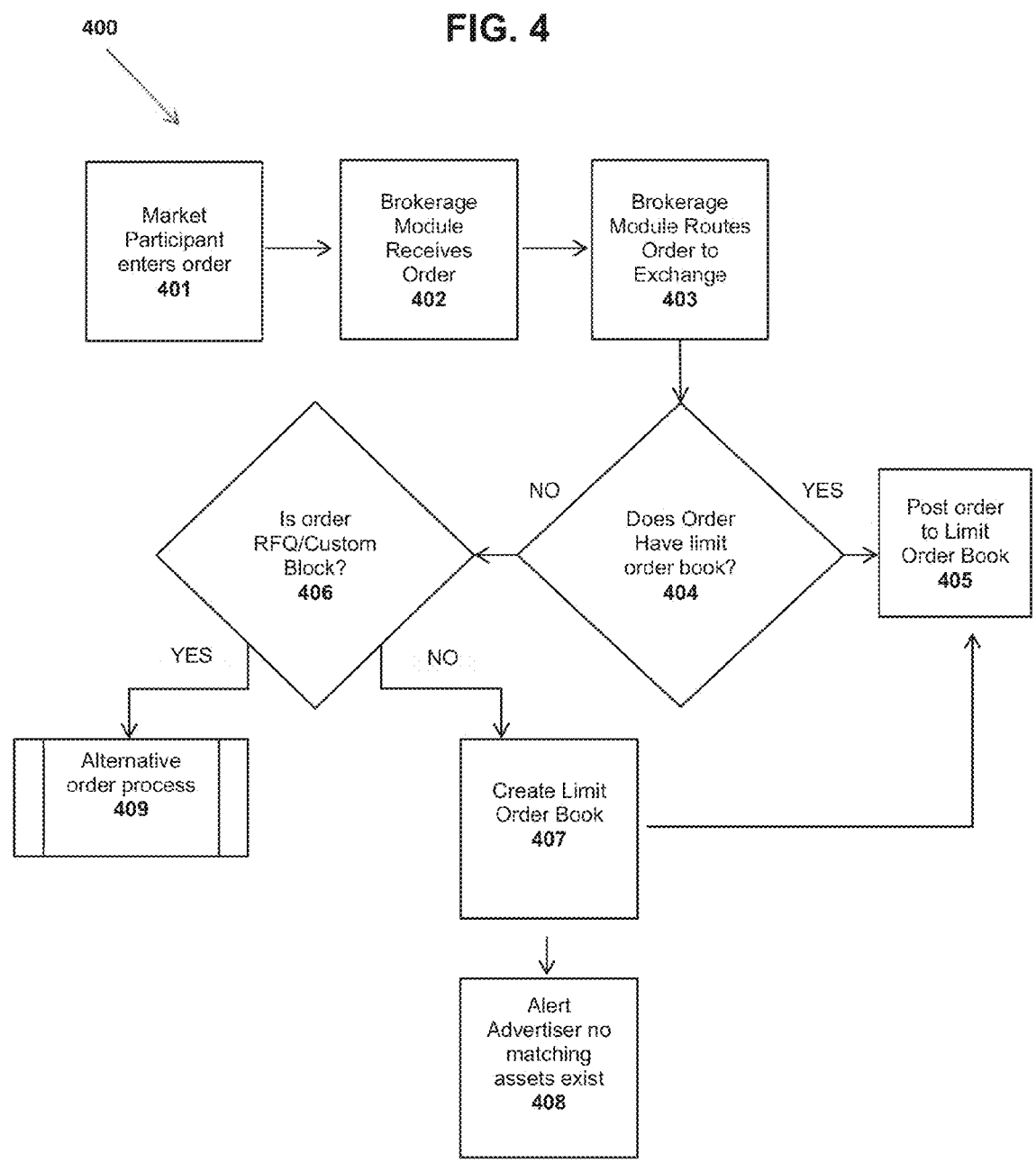
FIG. 4 illustrates an offer posting process 400 for enabling a market for structured advertising assets lacking liquidity for a functional continuous market, in accordance with an embodiment of the present invention.

FIG. 4 illustrates an offer posting process 400 for enabling a market for structured advertising assets lacking liquidity for a functional continuous market, in accordance with an embodiment of the present invention. In accordance with an embodiment of the present invention, the offer posting process 400 provides a mechanism for a continuous market to enable the trading of structured advertising assets along the entire spectrum of liquidity, from deeply liquid highly transacted assets to highly illiquid seldom transacted assets.

The offer posting process 400 begins when a market participant enters an order at step 401, in accordance with an embodiment of the present invention. Once the order is entered, the brokerage module receives the order at step 402 and routes the order to the exchange at step 403.

With the order received by the exchange system, the system will use the symbol for the order and determines whether the order has a limit order book at step 404. If the exchange determines that a limit order book for the order's symbol exists, the exchange system posts the order to the limit order book at step 405.

Alternatively, if the exchange determines that there is no limit order book for the symbol of the order, the exchange determines if the order is an RFQ, CB, IOI, etc. at step 406. If the order is not a Request For Quote (RFC), a Custom Bundle (CB), Indication Of Interest (IOI), or any other order type not transacted through an existing limit order book as apparent to one skilled in the art, the exchange creates a limit order book at step 407, in accordance with an embodiment of the present invention. In such an embodiment, if the exchange system determines that the order received was an order type not transacted through a limit order book, the order is sent through the alternative order process at step 408.

By way of non-limit example, Procter & Gamble is seeking to advertise a new Gillette razor on television. In such an example, the advertising agency representing the Gillette account uses the profile-based market to identify television broadcasters with the appropriate audience profile access rights and display space access rights in the market that represents the time during which the campaign is to be initiated, the length of the advertisement to be placed, and the audience characteristics which are the target demographics of the campaigns.

In the example, the advertising agency will enter one order for audience profile access rights representing males from middle income households identified as early adopters and the associated display space access rights matching their 30 second advertisement. Using the order entry user interface in FIG. 8, by way of non-limiting example, the advertising agency enters the order for the profile access rights and display space access rights at step 401.

The brokerage module receives the order at step 402 and routes the order to the exchange at step 403. In such an example, the orders entered by the advertising agency have significant liquidity in the market. At step 404, the exchange determines that there is an existing limit order book for both profile access rights and display space access rights, and therefore posts the orders to the limit order books at step 405.

Further, in such an example, the advertising agency would like to buy an advertising package, or bundle of rights, from Discovery Networks. Additionally, in this example, the advertising agency composes a bundle through a user interface and submits the bundled order through the brokerage module. After the exchange receives the order it will determine that there is no limit order book at step 404 and will then determine that the order is a custom bundle at step 406. In such an example, once the order is determined to be a custom bundle, the exchange routes the order through the alternative order process at step 409.

VI. Interfaces for Asset Verification

Figure 5:
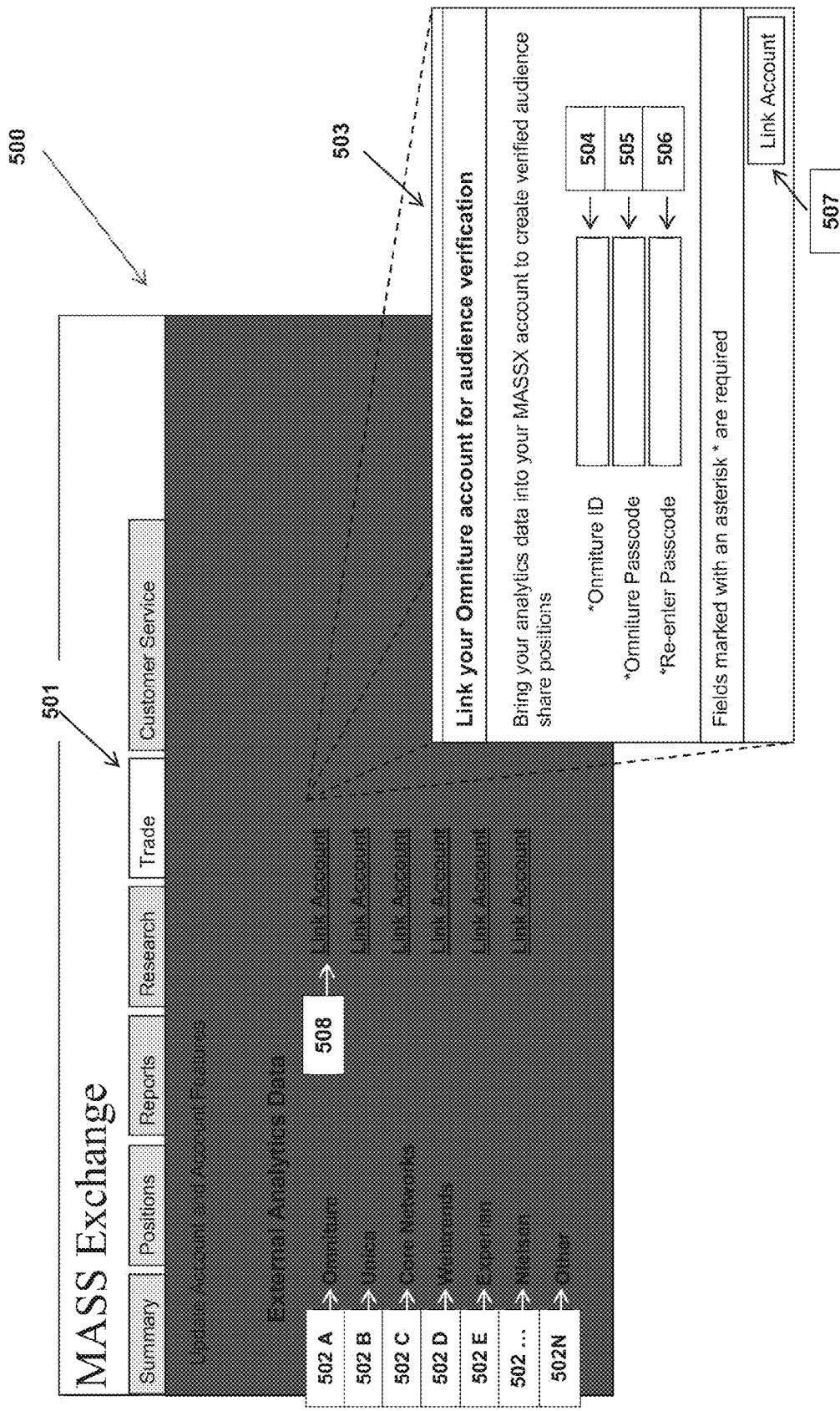
FIG. 5 illustrates an exemplary user interface for an asset verification module as part of a profile-based market, in accordance with an embodiment of the present invention.

FIG. 5 illustrates an exemplary user interface 500 for an asset verification module as part of a profile-based market, in accordance with an embodiment of the present invention. The exemplified user interface enables market participants to route data feeds to the profile-based market brokerage module for the creation and authorization of assets.

In an embodiment, third-party data is used to verify that audience production capabilities and associated audience profile characteristic are valid and measured rigorously, as the underlying data, for the creation of structured advertising assets, comprised of audience profile access rights and display space access rights, is supported through a user interface that enables Audience Producers to provide their credential to third-party data providers' data feeds for the import of data to the brokerage system.

In an additional embodiment, an Audience Producer, or another user such as its agent, that wishes to sell audience profile access rights and display space access rights provides data to prove that the capacity and historical performance of their publication or media to draw the volume and quality of the audience necessary to create the assets. In such an embodiment, the user interface of the asset verification module depicted in FIG. 5 provides a mechanism for the importation of data through an API, or other method apparent to one skilled in the art, from authorized third party sources that measure audience quality and volumes.

Further in such an embodiment, once logged into the brokerage module, the Audience Producer is able to navigate to the Trade 501 area of the brokerage module's user interface. In order to create new assets, which can be otherwise referred to as forward contracts for the access to an audience and display space, audience profile access rights, display space access rights, a derivative instrument, or another instrument apparent to one skilled in the art, the Audience Producer is able to select from one of a number of data providers 502A-N and use the link account 508 functionality to provide the user credentials necessary for the system to log-in to the audience producer's data provider 502A-N account or API and extract the relevant data.

In such an embodiment, the Audience Producer is able to click on the link account 508 link and an additional box, window, or other method apparent to one skilled in the art, which enables the Audience Producer to provide credentials, including the user ID 504 and password 505 appears. In such an embodiment, once the Audience Producer enters all the relevant data, the Audience Producer clicks the link account 507 button to submit the credentials to the brokerage system.

By way of non-limiting example, Comcast Corporation wishes to sell inventory of future advertising using the profile-based market. In order for Comcast to post structured advertising assets consisting of display space access rights and audience profile access rights to their account, the Audience Producer (Comcast Corporation, in this example) provides third-party data from authorized data providers to begin the asset posting process.

In such an example, for Comcast Corporation to provide the data necessary to create the structured advertising assets, three data sets must be provided, in accordance with an embodiment of the present invention. The two data sets required from third party sources, or other sources apparent to one skilled in the art, are the ratings of the individual broadcasts, to determine the number of likely viewers, which are used by the system to indicate the volume of assets that will be authorized to be created by the system.

In such an example, data from The Nielsen Company measuring the gross ratings points (GRP) within the media markets that Comcast Corporation serves is used by the asset verification module process 100 of FIG. 1 to determine the number of assets that will be authorized for creation. In order for the data to be inputted into asset verification module process 100, Comcast Corporation is able to use the user interface illustrated in FIG. 5 to select a data provider 502A-N, enter the user ID 504, password 505, re-entered Password 506, and any other requested information as required, to implement the transmission and storage of the account credentials to the brokerage system using the link account 507 button, in accordance with an embodiment of the present invention.

In such an example, the brokerage system may store Comcast Corporation's account credential for The Nielsen Corporation so that the system may extract, query, or call, without limitation, additional data from the data vendor (e.g., Nielsen). In such an example, the brokerage system is configured to use an application programming interface (API), scheduled data dumps, or any other method of information transfer apparent to one skilled in the art. Further, in such an example, Comcast Corporation provides data that describes the audience profile access rights. For audience profile access rights to be created, Comcast Cable must have data regarding the individuals or households, depending on the audience profile access rights contracts that will be brought to the market, describing various attributes which Audience Consumers will seek to purchase.

In such an example Comcast Corporation uses the user interface illustrated in FIG. 5 to select an additional data provider 502A-N, enter the user ID 504, password 505, re-entered password 506, and submits the account credentials to the brokerage system usirg the link account 507 button. In such an example, the brokerage system may store Comcast Corporation's account credential for a data company, such as Experian, so that the system can extract, query, or call, without limitation, additional data from the data vendor. In such an example, Comcast Cable can use its subscriber information, including subscriber name and address, in conjunction with the imported Experian descriptive personal or household data to identify what type of audience profile access right Comcast Cable will be able to produce for sale into the profile-based market.

VII. Describing Assets with Identifying and Listing Symbols

Figure 6:
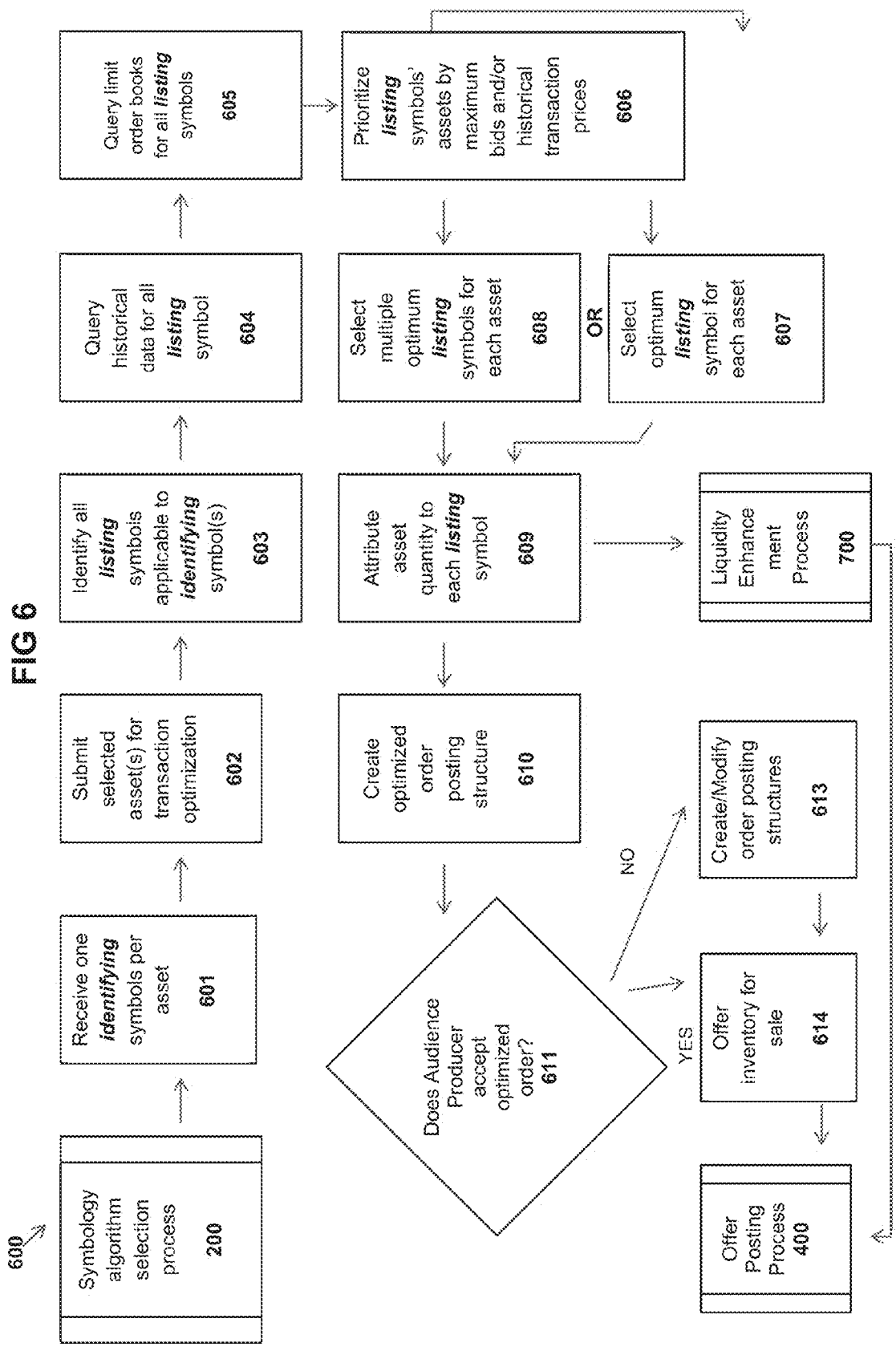
FIG. 6 illustrates a revenue optimization process for optimizing the revenue from the sale of audience profile access rights using a using a single identifying symbol and multiple listing assets, in accordance with an embodiment of the present invention.

FIG. 6 illustrates a revenue optimization process 600 for optimizing the revenue from the sale of audience profile access rights using a using a single identifying symbol and multiple listing symbols, in accordance with an embodiment of the present invention. The ability of an advertiser to sell assets within an exchange that may be described by multiple symbols is a problem unique to a profile-based market where advertisers seek to access audience members/subscribers, for the placement of media, such as an advertisement, where the audience members/subscribers meet a specific set of descriptors.

In an embodiment, the revenue optimization process 600 is used as part of a profile-based market to enable liquidity and market function for any or all identifying symbols that may be used to describe a single asset or a group of assets. The revenue optimization process 600 follows the completion of the symbology algorithm selection process 200 of FIG. 2, in accordance with an embodiment of the present invention.

In the first step, the process beings with receipt of one identifying symbol per asset at step 601 from the identifying symbol assignment process 200, in accordance with an embodiment of the present invention. The assets are submitted for transaction optimization at step 602. Since there are multiple ways to describe a single audience profile asset, there may be multiple listing symbols that can describe an asset that is indicated by a single identifying symbol. In such an embodiment, the use of differentiated identifying and listing symbols enables a greater degree of order entry simplicity for users and greater simplicity in the matching process.

Using the identifying symbol, the next step in the process is to identify listing symbols applicable to the identifying symbols at step 603, in accordance with an embodiment of the present invention. In accordance with a further embodiment of the present invention, step 603 results in identification of all listing symbols, within a set of available listing symbols, that apply to the identifying symbols.

The next step is to query historical data for all of the listing symbols at step 604 to measure the historical price performance of the different listing symbols that may be applicable to the identifying symbol, in accordance with an embodiment of the present invention. Further in such an embodiment, with the query complete, the revenue optimization process 600 now has the indicative data of how the different asset symbols have performed historically in terms of at least transaction price. In order to get a more complete picture for the optimization, the process also reviews the current depth of liquidity and market pricing as part of the optimization. Furthermore, to gather the data for current market pricing and depth, the next step in the process is to query the limit order books for all of the listing symbols at step 605.

With historical and current market data within the consideration set, the process proceeds to prioritize listing symbols for an asset by maximum bids and/or historical transaction prices at step 606, in accordance with an embodiment of the present invention. In an embodiment, the listing symbols are arranged in accordance to an algorithm that accounts for market conditions, such as historical transaction prices, expected time to sell at a particular price, and other criteria as would be appreciated by one skilled in the relevant arts. Based on this information, optimum listing symbols for each asset are selected at step 608. In such an embodiment, the optimum listing symbols may not include all listing symbols as the process determines that using some listing symbols may cause the Audience Producer's assets to be sold at a lower price than may be otherwise achieved in the market. Alternatively in such an embodiment, the system may select a single optimum listing symbol for the asset.

Once one or more listing symbols have been selected for the asset, the process attributes an asset quantity to each listing symbol at step 609, and creates an optimized order posting structure at step 610, which may include, but is not limited to, different order types such as market, limit, contingent, order-cancels-order, order-trigger-order, dark reserve, day, good till canceled, market on open, market on close, a stop order, or any other order type apparent to one skilled in the art.

In such an embodiment, the system then provides the transacting party the opportunity to approve the order posting structure at step 611, modify the order posting structure, if necessary, at step 613, or accept the order posting structure at step 614. In such an embodiment, once the revenue optimization process 600 is completed, the submitted order triggers the offer posting process 400 of FIG. 4.

In an alternate embodiment, after step 609, the Audience Consumer may use the liquidity enhancement process 700 of FIG. 7 (described in further detail below) to post each asset for sale using multiple listing symbols and orders to allow for price discovery and optimized revenue generation ability prior to posting the assets for sale using the offer posting process 400 of FIG. 4.

By way of non-limiting example, News Corporation, an Audience Producer, has multiple television and print publications which are delivered through addressable and non-addressable means. In such an example, News Corporation wishes to sell display space access right and audience profile access rights to one or more Audience Consumers, advertisers, for the placement of advertising or other media. News Corporation uses its subscriber list and purchases additional descriptive household or personal data from a marketing data provider such as Experian or Axciom, or uses another method where personally identifiable information is not exposed as is apparent to one skilled in the art, to enhance the audience profile access right descriptive data.

To use the revenue optimization process 600, News Corporation begins by submitting its subscriber data along with the data that it has purchased to the identifying symbol assignment process 200 of FIG. 2 for the assignment of a single identifying symbol for each individual or household audience member/subscriber profile. In such an embodiment, News Corporation receives one identifying symbol per asset at step 601. The selected assets are then submitted for transaction optimization at step 602.

Next, listing symbols applicable to the asset symbol are identified at step 603, and an aggregate list is provided for further processing. In such an example, News Corporation's millions of subscribers will each be described by one or more listing symbols. Because of the varied types of Audience Consumers that wish to buy rights for the placement of advertising or other media, the optimum symbology for all of the assets that News Corporation wishes to sell may require significant computational aralysis. In such an example, News Corporation uses the process to query historical data for all listing symbols at step 604, and also to query limit order books for all listing symbols at step 605.

The data provided to News Corporation, in this example, indicates that there is a significant portion of their audience that can be best described using the in-market for a new automobile categorization as a key driver for maximizing the price of the audience profile access right. Further, the same audience members can also be described as dog owners, households with children, and in-market for a tropical vacation, for example. In such an example, the revenue optimization process 600 provides a suggested combination of one or more symbols for these assets, to maximize the price of the asset sales over time, through prioritization of the listing symbols' assets by maximum bids and/or historical transaction prices at step 606, and the selection of multiple optimum listing symbols for each asset at step 608.

In such an example, the process provides an optimized combination of one or more symbols based on an estimate related to historical transactions and existing market demand. In such an example, the process provides News Corporation with a symbology combination which it may approve at step 611. In such an example, without limitation, News Corporation is provided with symbology combinations that allow the listing of audience members using multiple symbols, where symbols indicating dog ownership, in-market for a new automobile, presence of children in the household, and in-market for a tropical vacation, can be used in combination or independently to generate, numerous listing symbols for each audience profile access right. The process provides News Corporation with symbology combinations that will maximize revenue over the course of a six week period relative to the assets offered. However, the business objectives of News Corporation, in this example, require a much quicker sale and the Audience Producer, News Corporation, creates/modifies order posting structures at step 613 to ensure that is able to sell its assets over a much shorter period of time. Further in such an example, News Corporation may then offer inventory for sale at step 614 by entering an order to sell the inventory through the brokerage system. With the order entered, the revenue optimization process 600 ends, and the offer posting process 400 of FIG. 4 begins, in accordance with an embodiment of the present invention.

VIII. Posting With Multiple Fasting Symbols

Figure 7:
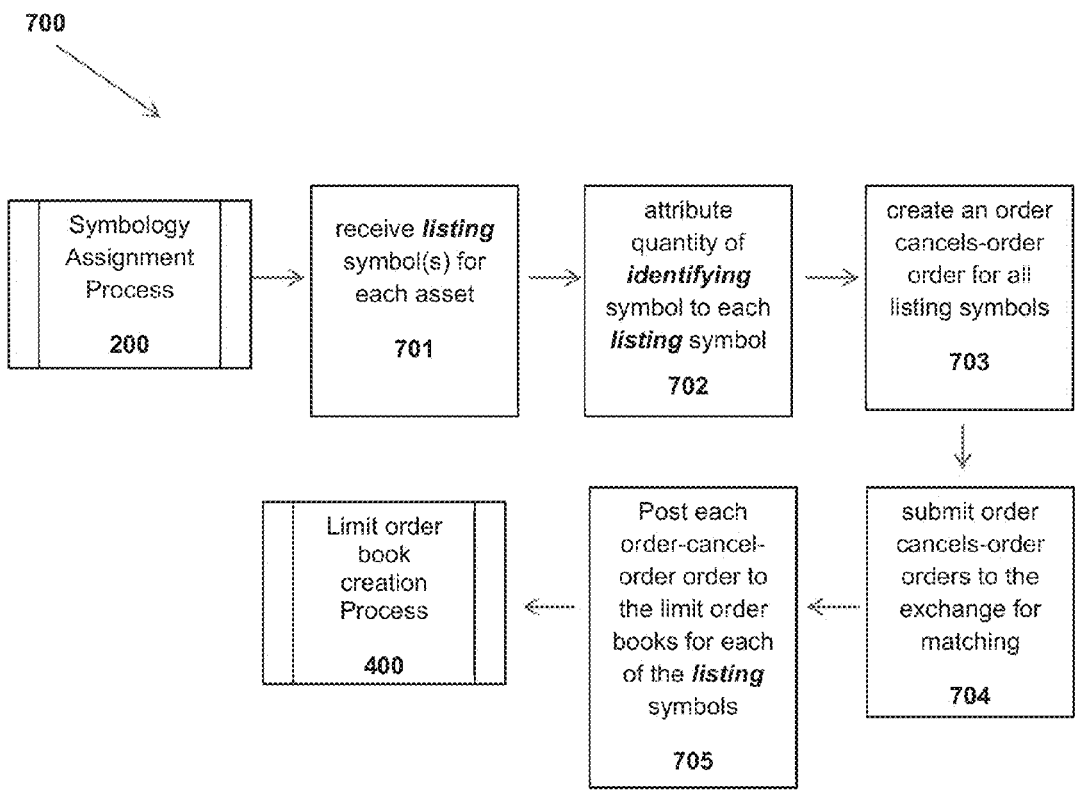
FIG. 7 illustrates a liquidity enhancement process for enhancing the liquidity of audience profile access rights and display space access rights by enabling the posting of offers to sell using multiple listing symbols for each asset, in accordance with an embodiment of the present invention.

FIG. 7 illustrates a liquidity enhancement process 700 for enhancing the liquidity of audience profile access rights and display space access rights by enabling the posting of offers to sell using multiple listing symbols for each asset, in accordance with an embodiment of the present invention. The process may be facilitated by an order-cancels-order process that enables price discovery for multi-faceted assets, in accordance with an embodiment of the present invention.

In an embodiment, the liquidity enhancement process 700 is used as part of a profile-based market to enable liquidity of assets within, but not limited to, narrowly described asset pools that provide true price discovery. Audience Producers understand that different Audience Consumers buy access to the same audience members/subscribers on the basis of different elements within the data describing those audience members/subscribers. Accordingly, in such an embodiment, when the symbology assignment process 200 of FIG. 2 is completed, the listing symbols assigned progress to the liquidity enhancement process 700.

The process begins with receiving listing symbols for each asset at step 701. Using the quantity associated with the listing symbol that was transmitted by the symbology assignment process 200, the process next attributes a quantity of an identifying symbol for the asset to each listing symbol 702.

The process then creates an order-cancels-order order for all of the associated listing symbols at step 703.

In such an embodiment, the market participant may use automated, algorithmic, manual processes, or other process apparent to one skilled in the art, to determine the quantity and asking price for each listing symbol in the order-cancels-order order. Once the selection of prices and quantities is completed, the process will submit order-cancels-order orders to the exchange for matching at step 704. In such an embodiment, the exchange receives the order-cancels-order orders and posts each order-cancels-order order to the limit order books for each of the listing symbols at step 705.

IX. Interfaces for Market Participants

FIG. 8 illustrates an exemplary user interface 800 for order entry of transaction in an organized electronic marketplace for structured advertising assets, in accordance with an embodiment of the present invention. One skilled in the relevant arts will appreciate that alternative implementations of a user interface are contemplated within the scope and spirit of this disclosure, and the exemplary user interface 800 of FIG. 8 is provided by way of example, and not limitation.

User interface 800 provides, by way of non-limiting example, fields 801 for navigating to the order entry user interface, 802 for the identification and selection of the account within with to transact, 803 the total account value of the selected account, 804 the cash available to buy within the selected account, 805 the cash used within the selected account, 806 to select the order type of the entered order, 807 to enter the symbol of the audience profile access right, 808 to enter the order price of the profile access right, 809 to select an action associated with the order type, 810 to enter the quantity of the desired order, 811 to select the time in force of the order, 812 to select the beginning date for order delivery, 813 to select the close date for the order delivery, 814 to place the order, 815 to enter the symbol of the display space access right, 808 to enter the order price of the display space access right, and 816 to select an action associated with the order type.

X. Example Computer System Implementation

Various embodiments and portions thereof of the present invention can be implemented by software, firmware, hardware, or a combination thereof. FIG. 9 illustrates an example computer system 900 in which the present invention, or portions thereof, can be implemented as computer-readable code. For example, the behaviors of flowcharts 100 of FIG. 1, 200 of FIG. 2, 300 of FIG. 3, 400 of FIG. 4, 600 of FIG. 6, and 700 of FIG. 7 can be implemented in system 900. Various embodiments of the invention are described in terms of this example computer system 900. After reading this description, it will become apparent to a person skilled in the relevant art how to implement the invention using other computer systems and/or computer architectures.

Computer system 900 includes one or more processors, such as processor 904. Processor 904 can be a special purpose or a general purpose processor. Processor 904 is connected to a communication infrastructure 906 (for example, a bus or network).

Computer system 900 also includes a main memory 908, preferably random access memory (RAM), and may also include a secondary memory 910. Secondary memory 910 may include, for example, a hard disk drive 912, a removable storage drive 914, and/or a memory stick. Removable storage drive 914 may comprise a floppy disk drive, a magnetic tape drive, an optical disk drive, a flash memory, or the like. The removable storage drive 914 reads from and/or writes to a removable storage unit 918 in a well-known manner. Removable storage unit 918 may comprise a floppy disk, magnetic tape, optical disk, etc. that is read by and written to by removable storage drive 914. As will be appreciated by persons skilled in the relevant art(s), removable storage unit 918 includes a computer usable storage medium having stored therein computer software and/or data.

In alternative implementations, secondary memory 910 may include other similar means for allowing computer programs or other instructions to be loaded into computer system 900. Such means may include, for example, a removable storage unit 922 and an interface 920. Examples of such means may include a program cartridge and cartridge interface (such as that found in video game devices), a removable memory chip (such as an EPROM, or PROM) and associated socket, and other removable storage units 922 and interfaces 920 that allow software and data to be transferred from the removable storage unit 922 to computer system 900.

Computer system 900 may also include a communications interface 924. Communications interface 924 allows software and data to be transferred between computer system 900 and external devices. Communications interface 924 may include a modem, a network interface (such as an Ethernet card), a communications port, a PCMCIA slot and card, or the like. Software and data transferred via communications interface 924 are in the form of signals that may be electronic, electromagnetic, optical, or other signals capable of being received by communications interface 924. These signals are provided to communications interface 924 via a communications path 926. Communications path 926 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 918, removable storage unit 922, and a hard disk installed in hard disk drive 912. Signals carried over communications path 926 can also embody the logic described herein. Computer program medium and computer usable medium can also refer to memories, such as main memory 908 and secondary memory 910, which can be memory semiconductors (e.g. DRAMs, etc.). Physical storage and memories, such as the aforementioned removable storage unit 918, removable storage unit 922, and a hard disk installed in Lard disk drive 912, as well as main memory 908 and secondary memory 910, may be generally referred to as computer-readable storage devices. These computer program products are means for providing software to computer system 900.

Computer programs (also called computer control logic) are stored in main memory 908 and/or secondary memory 910. Computer programs may also be received via communications interface 924. Such computer programs, when executed, enable computer system 900 to implement the present invention as discussed herein. In particular, the computer programs, when executed, enable processor 904 to implement the processes of the present invention, such as the steps in the methods illustrated by the behaviors of flowcharts 100 of FIG. 1, 200 of FIG. 2, 300 of FIG. 3, 400 of FIG. 4, 600 of FIG. 6, and 700 of FIG. 7, discussed above. Accordingly, such computer programs represent controllers of the computer system 900. Where the invention is implemented using software, the software may be stored in a computer program product and loaded into computer system 900 using removable storage drive 914, interface 920, hard drive 912 or communications interface 924.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

XI. Conclusion

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method comprising:
   receiving, by one or more computing devices, an inventory description of an advertising asset for sale;
   generating, by the one or more computing devices, plurality of sell orders each representing the advertising asset using a different combination of attributes of the advertising asset, wherein the attributes represent characteristics of an audience or display space;
   prioritizing, by the one or more computing devices the plurality of sell orders to generate an order posting subset of the plurality of sell orders in accordance with historical data associated with the plurality of sell orders; and
   posting, by the one or more computing devices, the advertising asset for sale under each of the sell orders of the order posting subset concurrently, wherein each of the sell orders of the of the order posting subset is usable to match a buy order with the advertising asset, and wherein matching the buy order with any one of the sell orders of the order posting subset cancels the remaining of the sell orders of the order posting subset.

2. The method of claim 1,
   wherein posting the advertising asset for sale under each of the sell orders of the order posting subset concurrently comprises posting the advertising asset for sale using a plurality of listing symbols assigned to the advertising asset.

3. The method of claim 1, wherein receiving the inventory description comprises:
   receiving third party analytic data regarding the advertising asset.

4. The method of claim 3, further comprising:
   verifying the advertising asset using the third party analytic data.

5. The method of claim 1, further comprising:
   generating a plurality of listing symbols based on the attributes of the advertising asset and corresponding to the sell orders of the order posting subset; and
   assigning the plurality of listing symbols to the advertising asset.

6. The method of claim 5, further comprising:
   querying the historical data for the plurality of listing symbols,
   wherein prioritizing the plurality of sell orders to generate the order posting subset of the plurality of sell orders comprises prioritizing the plurality of listing symbols to provide an arrangement, in an order posting structure, of expected prices for the advertising asset based on market conditions.

7. The method of claim 5, further comprising:
   determining a quantity of the advertising asset based on the inventory description; and
   attributing the quantity of the advertising asset to the plurality of listing symbols.

8. The method of claim 5, wherein posting the advertising asset for sale under each of the sell orders of the order posting subset concurrently comprises:
   posting each of the sell orders of the order posting subset to a limit order book for each of the plurality of listing symbols; and
   posting corresponding respective prices for each of the sell orders of the order posting subset in the limit order book.

9. The method of claim 8, wherein the sell order specifies that matching the buy order with the sell order cancels the remaining of the sell orders of the order posting subset.

10. The method of claim 1, further comprising:
    approving the inventory description of the advertising asset; and
    posting the inventory description of the advertising asset to an account of a seller.

11. A computer-readable storage device having instructions stored thereon, execution of which, by one or more computing devices, causes the one or more computing devices to perform operations comprising:
    receiving an inventory description of an advertising asset for sale;

generating a plurality of sell orders each representing the adverting asset using a different combination of attributes of the advertising asset, wherein the attributes represent characteristics of an audience or display space;

prioritizing the plurality of sell orders to generate an order posting subset of the plurality of sell orders in, accordance with historical data associated with the plurality of sell orders; and posting the advertising asset for sale under each of the sell orders of the order posting subset concurrently, wherein each of the sell orders of the order posting subset is usable to match a buy order with the advertising asset, and wherein matching the buy order with any one of the sell orders of the order posting subset cancels the remaining of the sell orders of the order posting subset.

12. The computer-readable storage device of claim 11, wherein posting the advertising asset for sale under each of the sell orders of the order posting subset concurrently comprises posting the advertising asset for sale using a plurality of listing symbols assigned to the advertising asset.

13. The computer-readable storage device of claim 11, wherein receiving the inventory description comprises:
receiving third party analytic data regarding the advertising asset.

14. The computer-readable storage device of claim 13, the operations further comprising:
verifying the advertising asset using the third party analytic data.

15. The computer-readable storage device of claim 11, the operations further comprising:
generating a plurality of listing symbols based on the attributes of the advertising asset and corresponding to the sell orders of the order posting subset; and
assigning the plurality of listing symbols to the advertising asset.

16. The computer-readable storage device of claim 15, the operations further comprising:
querying the historical data for the plurality of listing symbols,
wherein prioritizing the plurality of sell orders to generate the order posting subset of the pluralit of sell orders comprises prioritizing the plurality of listing symbols to provide an arrangement, in an order posting structure, of expected prices for the advertising asset based on market conditions.

17. The computer-readable storage device of claim 15, the operations further comprising:
determining a quantity of the advertising asset based on the inventory description; and
attributing the quantity of the advertising asset to the plurality of listing symbols.

18. The computer-readable storage device of claim 15, wherein posting the advertising asset for sale under each of the sell orders of the order posting subset concurrently comprises:
posting each of the sell orders of the order posting subset to a limit order book for each of the plurality of listing symbols; and
posting corresponding respective prices for each of the sell orders of the order posting subset in the limit order book.

19. The computer-readable storage device of claim 18, wherein the sell order specifies that matching the buy order with the sell order cancels the remaining of the sell orders of the order posting subset.

20. The computer-readable storage device of claim 11, the operations further comprising:

approving the inventory description of the advertising asset; and
posting the inventory description of the advertising asset to an account of a seller.

21. A system comprising:
a memory configured to store modules comprising:
a receiving module configured to receive an inventory description of an advertising asset for sale,
a generating module configured to generate a plurality of sell orders each representing the advertising asset using a different combination of attributes of the advertising asset, wherein the attributes represent characteristics of an audience or display space,
a prioritizing module configured to prioritize the plurality of sell orders, to generate an order posting subset of the plurality of sell orders in accordance with historical data associated with the plurality of sell orders, and
a posting module configured to post the advertising asset for sale under each of the sell orders of the order posting subset concurrently, wherein each of the sell orders of the order posting subset is usable to match a buy order with the advertising asset, and wherein matching the buy order with any one of the sell orders of the order posting, subset cancels the remaining of the sell orders of the order posting subset; and
one or more processors configured to process the modules.

22. The system of claim 21,
wherein the posting module is further configured to post the advertising asset for sale under each of the sell orders of the order posting, subset concurrently by posting the advertising asset for sale using a plurality of listing symbols assigned to the advertising asset.

23. The system of claim 21, wherein receiving the inventory description comprises:
receiving third party analytic data regarding the advertising asset.

24. The system of claim 23, further comprising:
a verifying module configured to verify the advertising asset using the third party analytic data.

25. The system of claim 21, wherein the generating module is further configured to generate a plurality of listing symbols based on the attributes of the advertising asset and corresponding to the sell orders of the order posting subset, and to assign the plurality of listing symbols to the advertising asset.

26. The system of claim 25, further comprising:
a querying module configured to query the historical data for the plurality of listing symbols,
wherein the prioritizing module is further configured to prioritize the plurality of listing symbols to provide an arrangement, in an order posting structure of expected prices for the advertising asset based on market conditions.

27. The system of claim 25, further comprising:
a determining module configured to determine a quantity of the advertising asset based on the inventory description and to attribute the quantity of the advertising asset to the plurality of listing symbols.

28. The system of claim 25, wherein the posting module is further configured to post each of the sell orders of the order posting subset to a limit order book for each of the plurality of listing symbols, and to post corresponding respective prices for each of the sell orders of the order posting subset in the limit order book.

29. The system of claim 28, wherein the sell order specifies that matching the buy order with the sell order cancels the remaining of the sell orders of the order posting subset.

30. The system of claim 21, further comprising:
an approving module configured to approve the inventory description of the advertising asset; and
a posting module configured to post the inventory description of the advertising asset to an account of a seller.

* * * * *

UNITED STATES PATENT AND TRADEMARK OFFICE
CERTIFICATE OF CORRECTION

| | | |
|---|---|---|
| PATENT NO. | : 8,442,859 B1 | Page 1 of 1 |
| APPLICATION NO. | : 13/450041 | |
| DATED | : May 14, 2013 | |
| INVENTOR(S) | : Broms et al. | |

It is certified that error appears in the above-identified patent and that said Letters Patent is hereby corrected as shown below:

Title Page
Item (57), Abstract, Line 5 please replace "gamer" with --garner--.

In the Claims:
Column 19
Lines 61-62, Claim 1, please replace "plurality" with --a plurality--.
Line 66, Claim 1, please replace "devices" with --devices,--.

Column 20
Line 7, Claim 1, please replace "of the of the" with --of the--.

Column 21
Line 2, Claim 11, please replace "adverting" with --advertising--.
Line 6, Claim 11, please replace "orders in," with --orders in--.
Line 42, Claim 16, please replace "pluralit" with --plurality--.

Column 22
Line 15, Claim 21, please replace "sell orders," with --sell orders--.
Line 25, Claim 21, please replace "posting," with --posting--.
Line 31, Claim 22, please replace "posting," with --posting--.
Line 51, Claim 26, please replace "structure" with --structure,--.

Signed and Sealed this
Twentieth Day of August, 2013

Teresa Stanek Rea
*Acting Director of the United States Patent and Trademark Office*